United States Patent

Tatoian

[11] Patent Number: 5,997,147
[45] Date of Patent: Dec. 7, 1999

[54] TV VIEWING SYSTEM

[76] Inventor: James Z. Tatoian, 3800 Shadow Grove Rd., Pasadena, Calif. 91107

[21] Appl. No.: 08/904,822

[22] Filed: Aug. 1, 1997

[51] Int. Cl.⁶ .............................. G02B 5/08; G02B 7/182; B60R 1/10
[52] U.S. Cl. ..................... 359/856; 359/857; 359/862; 359/865; 359/881
[58] Field of Search ..................... 359/855, 856, 359/857, 858, 861, 862, 863, 865, 881, 872; 248/479, 480, 484, 485, 486, 487

[56] References Cited

U.S. PATENT DOCUMENTS

| | | | |
|---|---|---|---|
| 1,318,812 | 10/1919 | Smith | 359/879 |
| 2,428,649 | 10/1947 | Brown . | |
| 3,019,689 | 2/1962 | Paulsrud | 359/879 |
| 3,771,854 | 11/1973 | Roark . | |
| 4,050,790 | 9/1977 | Jorwa . | |
| 4,188,740 | 2/1980 | Forman . | |
| 4,360,836 | 11/1982 | Breck et al. . | |
| 4,531,813 | 7/1985 | Van Den Berg . | |
| 4,607,401 | 8/1986 | Sisson . | |
| 4,650,299 | 3/1987 | Stevens et al. . | |
| 4,902,118 | 2/1990 | Harris . | |
| 5,054,139 | 10/1991 | Jones . | |
| 5,061,055 | 10/1991 | Dube | 359/862 |
| 5,173,781 | 12/1992 | Masreliez . | |
| 5,237,459 | 8/1993 | Strauss . | |
| 5,459,893 | 10/1995 | Walters, III . | |
| 5,471,264 | 11/1995 | Hsia et al. | 359/857 |

*Primary Examiner*—Ricky D. Shafer
*Attorney, Agent, or Firm*—Art Freilich; Bob Hornbaker; Leon Rosen

[57] ABSTRACT

An apparatus is provided that enables a person reclined on a bed to comfortably view a television screen (36) that is set up for ordinary viewing, which is small and lightweight, of low cost, and easily used. The apparatus includes a frame (64) that can be mounted on a wall (66) and a pair of mirrors (60, 62) mounted on the frame. A first of the mirrors (60) lies above the head (H) of the reclined viewer so he can comfortably view the first mirror, while the second mirror (62) is positioned to reflect light from the screen toward the first mirror, with the first mirror then reflecting the light to the viewer. In one apparatus, the frame includes a wall mount (72) that lies behind and above the viewer's head, an arm (64) extending forwardly from the mount, and a mirror support lying at the outer end of the arm. Each of the mirrors is pivotally mounted on the mirror support about a primarily horizontal axis for fine adjustment. The inner end of the arm is pivotally mounted on the wall mount about a vertical axis (130), so the entire apparatus can be readily swung away from a position above the head of the viewer.

3 Claims, 3 Drawing Sheets

5,997,147

TV VIEWING SYSTEM

BACKGROUND OF THE INVENTION

Television and computer screens are usually mounted at a height of about three feet above the ground and face primarily horizontally, for comfortable viewing by a seated person. People who are reclined on a bed often wish to view the screen, but find it uncomfortable to do so. In hospitals, a television is often mounted near the ceiling and faces at a downward incline for viewing by a patient reclined on a bed. However, it is inconvenient to mount a television in that position, and in that position it is uncomfortable to view the television screen when seated. A relatively simple apparatus that allowed a person reclined on a bed to view a screen set up for direct viewing by a seated person, would be of value.

SUMMARY OF THE INVENTION

In accordance with one embodiment of the present invention, an apparatus is provided that aids in viewing a screen by a reclined viewer, which is of low cost and lightweight construction, easy to install and set up, and easily moved out of the way. The apparatus includes a frame and a pair of mirrors mounted on the frame. A first of the mirrors is positioned primarily directly above the eyes of the viewer for easy direct viewing by him/her, while the second mirror is positioned to reflect light from the screen to the first mirror so the first mirror can reflect the light to the viewer. The use of two mirrors provides an image that enables reading of words on the screen (not "mirror image"), while facilitating adjustment.

One apparatus includes a wall mount for mounting directly on a vertical wall of a room or of a bed headboard. An arm extending forwardly from the wall mount has an arm outer end that supports a mirror holder on which the two mirrors are held. The mirrors are pivotally mounted about parallel, primarily horizontal axes on the mirror holder for adjustment. The arm has an inner end that is pivotally mounted about a vertical axis on the wall mount, to allow the arm and mirror holder to pivot so the mirror holder lies near the wall and is out of the way of the viewer when the viewer rises from the bed.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
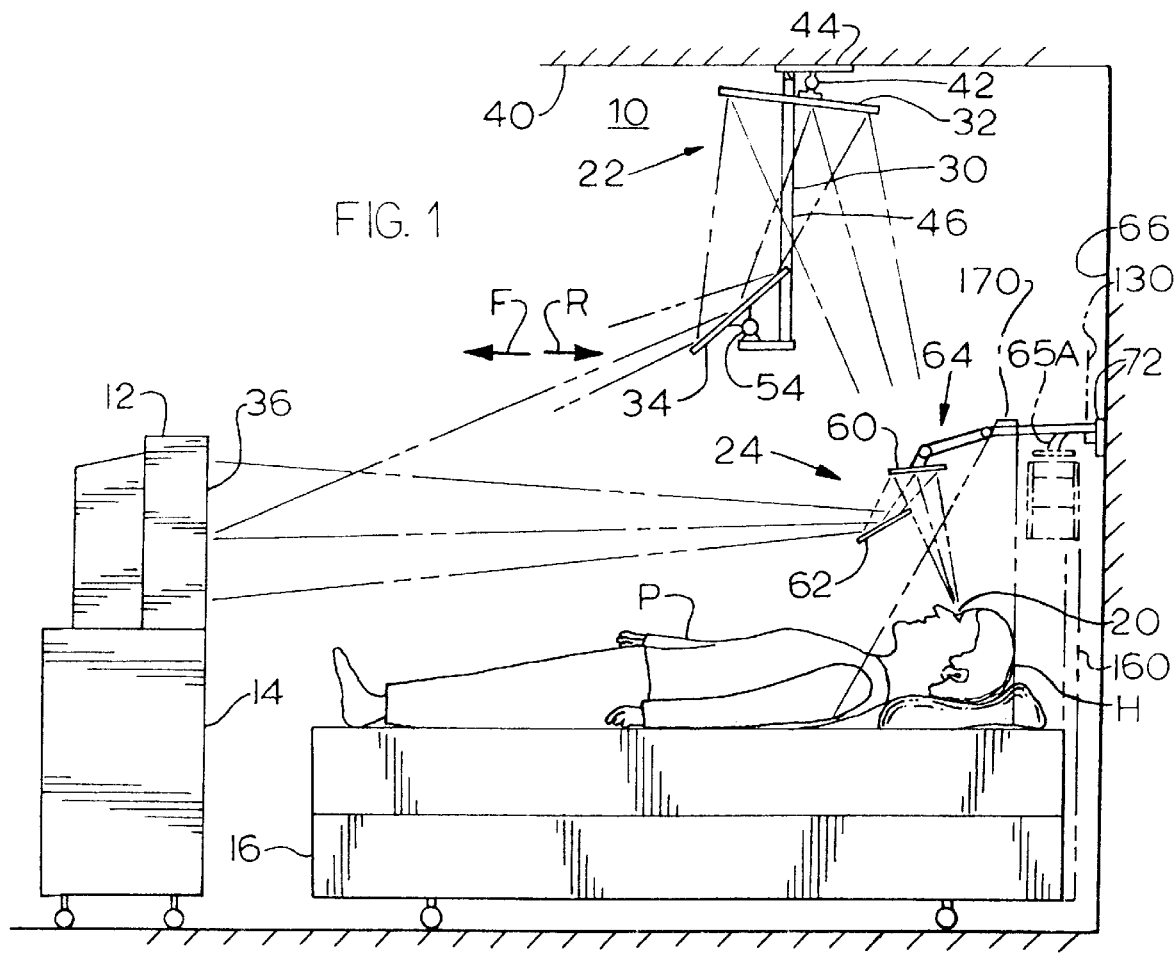
FIG. 1 is a side elevation view of apparatus constructed in accordance with the present invention, showing how it is used to view a screen.

FIG. 1 shows a room 10 containing a monitor 12 for a television or computer. The monitor lies on a stand 14 and can be comfortably viewed by a person with an upright upper body, as when the person is seated. The figure also shows a bed 16 in the room, and a reclined person P lying on the bed, with the head H of the person at the rear of the bed and on a pillow. The eyes or viewing position 20 of the person lies near the rear of the bed, about eight inches above the bed, and faces primarily upward, though usually with a forward incline from the vertical of about 150°. The screen can be viewed from the viewing position 20 by a first viewing apparatus 22 that applicant earlier built and tested, and by a second viewing apparatus 24 that applicant has built and tested and which applicant believes is superior to the first one.

The first viewing apparatus 22 includes a frame 30 and a pair of mirrors 32, 34 mounted on the frame. The first mirror 32 is positioned to be directly viewed by the reclined viewer. The second mirror 34 is positioned to reflect light from the screen 36 of the monitor toward the first mirror 32, so the first mirror can reflect it to the viewer at the viewing position 20. The frame 30 is designed to mount directly against the ceiling wall 40 of the room, at a fixed position. A first universal joint 42, which allows the first mirror to pivot about two perpendicular horizontal axes, is held on a wall mount 44 of the frame. The frame also includes a holder 46 comprising top and bottom bars, and comprising a pair of parallel side bars 50, 52 that support the lower mirror 34 through another universal joint 54. At some positions of the mirrors, each of them lies directly between the side bars 50, 52.

The first viewing apparatus 22 enabled good viewing of the screen, but required relatively large mirrors and a tall holder 46. The large size of the mirrors and holder resulted in substantial cost and weight for them. The weight, though only a few pounds, is important to the viewer, because the viewer is often afraid that the viewing apparatus will fall from the ceiling and hit the viewer, especially in the event of an earthquake. The fact that the holder 46 was fixed in position on the ceiling, resulted in the need for universal joints to assure that the image of the screen was reflected to the viewer. The long path of the reflected light made the screen appear about 70% further than the direct distance between the viewer at 20 and the screen 36.

The second viewing apparatus 24 of FIG. 1 also includes first and second mirrors 60, 62 that are mounted on a frame 64 that is held to a room wall, the particular wall shown being a vertical wall 66 that lies rearward R of the person, or viewer. As in the case of the first apparatus, the first mirror 60 is positioned to be comfortably directly viewed from the viewing position 20, and the second mirror 62 is positioned and oriented to direct light from the screen 36 to the first mirror 60 for reflection therefrom to the viewer.

Figure 2:
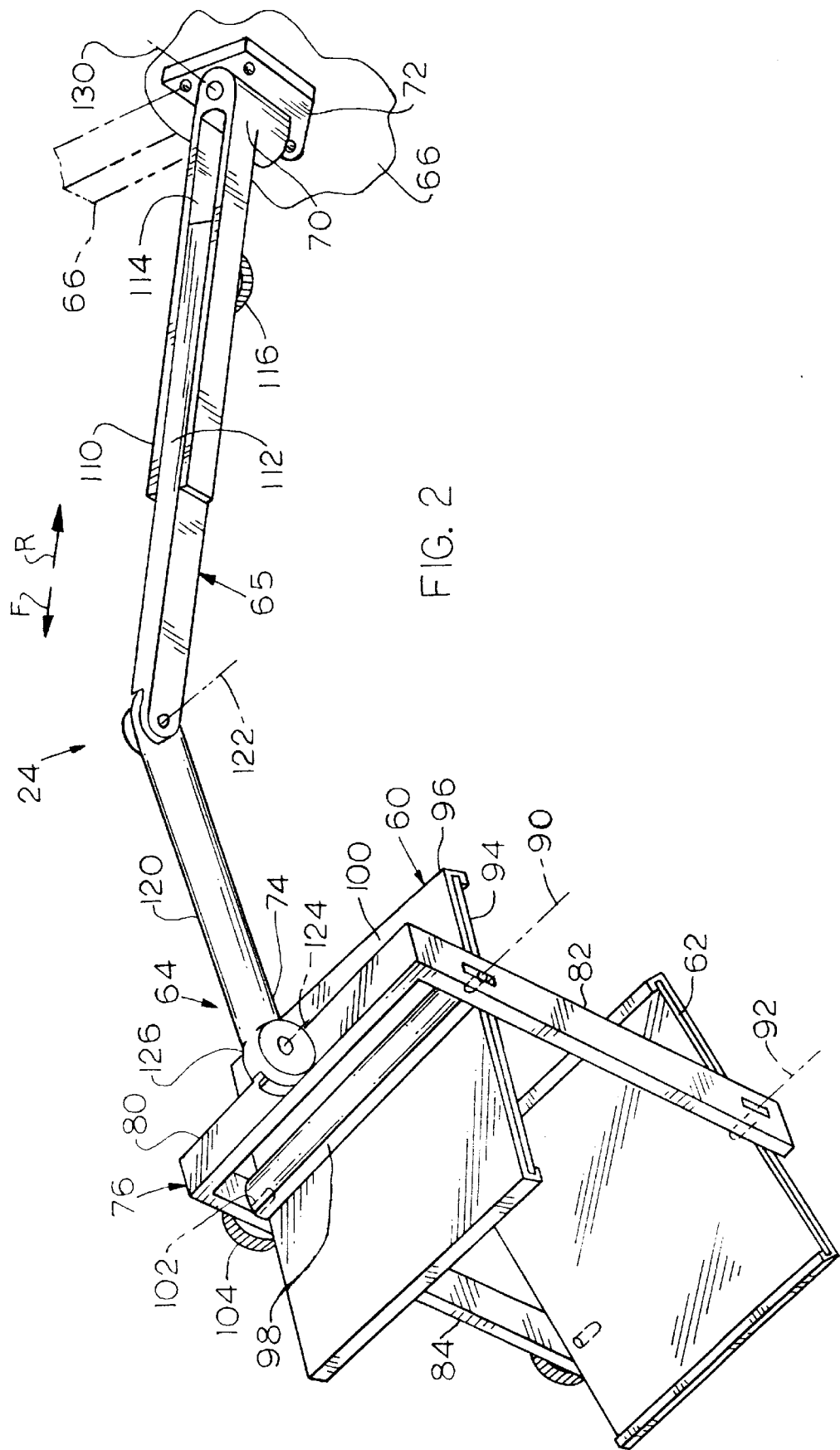
FIG. 2 is an isometric view of one viewing apparatus shown in FIG. 1.
Figure 3:
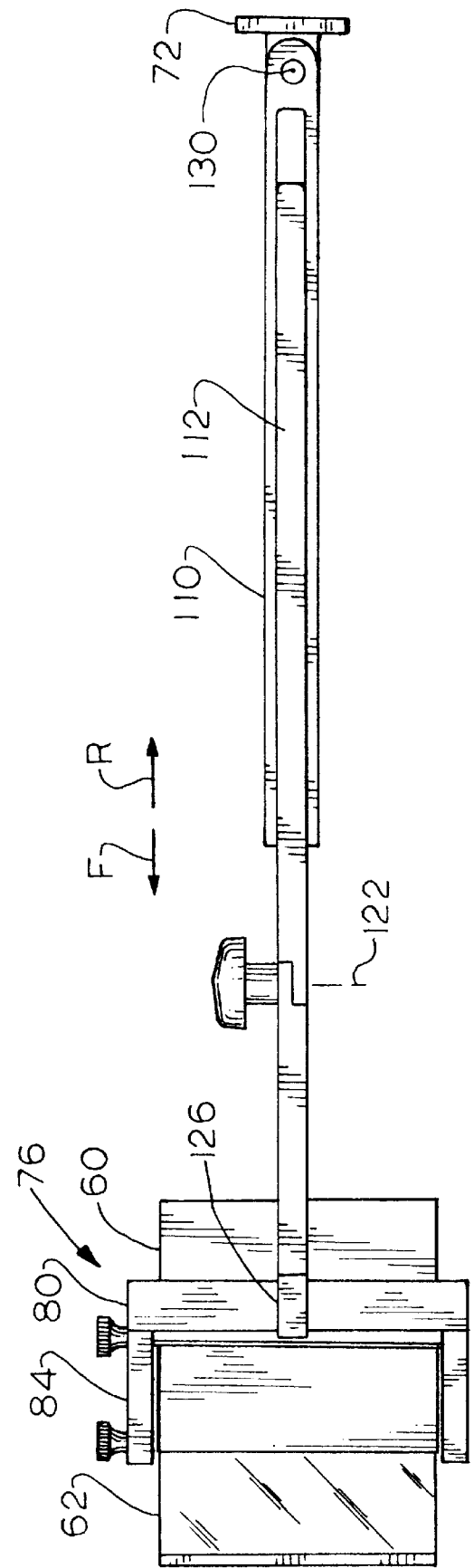
FIG. 3 is a plan view of the apparatus of FIG. 2.

FIG. 2 illustrates details of the second viewing apparatus 24. The frame 64 includes an arm 65 having an inner end 70 that is supported by a wall mount 72 and having an outer end 74 that supports a mirror holder 76. The mirror holder includes a primarily horizontal beam 80 and a pair of side beams 82, 84. Each of the mirrors 60, 62 is pivotally mounted about a corresponding axis 90, 92 on the side beams 82, 84. The two axes 90, 92 are parallel and primarily horizontal. It may be noted that each mirror such as mirror 60 includes a coated glass reflector 94 held by a largely plate-like member 96 that includes an enlarged middle 98. A pair of pins 100, 102 (or one rod) extend through the enlarged middle 98 to pivotally support the mirror. The first pin 102 is in the form of a screw with a knob 104 at the end that can be turned to tighten the first mirror against the side beam 84 to fix the first mirror pivotal position. The second mirror 62 is similarly held.

The arm 65 includes a horizontal adjustment part 110 that has a slider 112 that can slide inwardly and outwardly within a trough 114, with a screw 116 projecting through a slot in the bottom of the trough to fix the slide in place. This allows the mirror support 76 to be moved inwardly and outwardly, which are directions parallel to the rearward and forward directions R, F for the illustrated arm position. The arm also has a link 120 with inner and outer ends pivotally connected respectfully to the slide 112 and to the mirror support 76 to enable the mirror support to tilt about two horizontal axes 122, 124. A ball joint at 126 allows the mirror support to pivot about three perpendicular axes. The sliding and tilting permit versatile adjustment of the position and orientation of the mirrors, with the axes of the mirrors remaining parallel. Instead of using a horizontal adjust part 110, it is possible to provide an additional link that is pivotally connected about horizontal axes at its a opposite ends. It is possible to allow pivoting about a vertical axis at the outer end of the arm. Also, instead of using two mirrors, four mirrors or prisms can be used, although these are not preferred. Prisms are not preferred because prisms of a few inches width and length are heavy and expensive.

Figure 5:
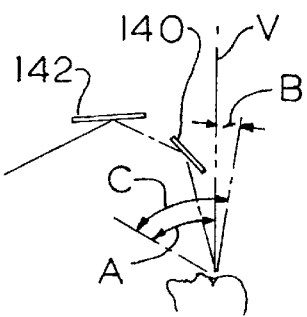
FIG. 5 is a side elevation view of another mirror arrangement that can be used in the apparatus of FIG. 1.
Figure 4:
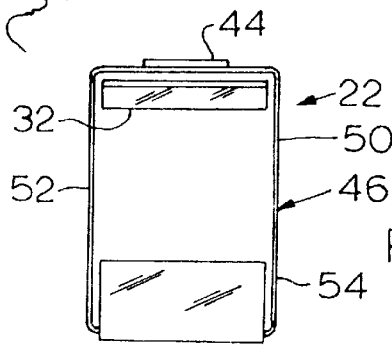
FIG. 4 is a front elevation view of another viewing apparatus shown in FIG. 1.

The arm inner end 70 is pivotally mounted about a vertical axis 130 on the wall mount 72. This allows the mirrors to lie closely above the person's head, and still allow the person to easily lift himself from the bed. Before lifting himself from the bed by raising his head, the person pivots the arm about the vertical axis 130, as to the position 65A so the mirrors and mirror supports 76 are not closely above the person's head. Applicant prefers to define a region or position primarily directly above a person's head, as shown in FIG. 5, within an angle A of no more than 60° from the vertical V (which passes through 20) in a direction forward of the viewing position 20, and within at an angle B of no more than 10° from the vertical in a direction to the rear of the viewing position. The mirror (e.g. 140) directly viewed by the viewer should lie in this region. The fact that the arm pivots at 130, also allows easy adjustment to view television screens that are not directly forward (F) at the bed.

Applicant has constructed and tested a viewing apparatus of the type illustrated in FIG. 2. The first, or directly viewed mirror 60 had a width and length of 4.5 inches, while the second mirror 62 had a length (in directions F, R) of 5.5 inches and a width of 4.5 inches. The arm had a usual length (as shown in FIG. 2) of about two feet in its fully extended position. The entire apparatus had a weight of fifteen ounces. The small size of the mirrors and arm resulted in an apparatus of moderate cost, with the low weight enabling easy secure mounting on the wall. The small weight and the fact that the apparatus usually lay less than one foot above the viewer's head, avoided any fear in most viewers that they might be injured if the apparatus dropped, as in the event of an earthquake or because of poor mounting. The fact that the mirrors were pivotable and the link 120 was pivoted at its opposite ends, resulted in avoidance of harm to the viewer even if the viewer's head was raised in the middle of the night before the arm was pivoted out of the way, with the viewer's head not being injured and not damaging the apparatus. In FIG. 1, the viewing distance to the screen by light reflected from the mirrors 60, 62 is only 15% greater than the direct distance from the screen 36 to the viewer at 20.

Figure 6:
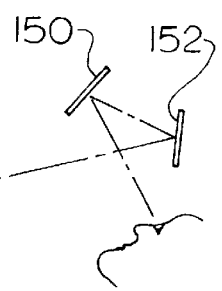
FIG. 6 is a side elevation view of still another mirror arrangement.

A variety of dual mirror arrangements can be used, including the arrangement shown in FIG. 5 that includes two mirrors 140, 142 and the arrangement of FIG. 6 that includes two mirrors 150 and 152. Applicant has tried the various arrangements, and found that the arrangement shown for the apparatus 24 of FIG. 1 was superior in positioning the mirrors close together and at a low height above the viewer.

Although FIG. 1 shows the frame 64 held by a mount 72 fastened to the vertical wall 66 of the room, it is also possible to fasten the mount to a headboard wall 160 formed by a bed headboard. It is also possible to use a separate support indicated at 170 that lies on the bed or on the floor of the room. However, applicant's mounting on a vertical wall such as 66 of the room, enables secure, steady, and easy mounting.

Although it is anticipated that the viewing will be primarily of a television screen, and sometimes of a computer monitor screen, there are occasions where the viewer wishes to view other scenes, such as the view outside a window or of visiting relatives.

Thus, the invention provides apparatus for aiding in the viewing of a scene such as a picture on a monitor screen, by a reclined viewer. The apparatus includes a frame and a pair of mirrors mounted on the frame. A first mirror is positioned for easy direct viewing by the viewer, while the second mirror is positioned and oriented to reflect light from the scene or screen to the first mirror. A preferred apparatus includes relatively small mirrors lying within one meter and preferably no more than eighteen inches above the viewing position formed by the reclined person's eyes, with the mirrors held by a frame that is mounted on a vertical wall in the room. The frame preferably includes an arm with an inner end that is pivotally mounted about a vertical axis on a wall mount, so the arm can be pivoted to move the mirrors out of the way of the reclined person when he/she is rising.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for the indirect viewing of a screen that lies generally forward of a reclined person, whose feet lie forward of a person's head comprising:

a mirror support and a frame for supporting said mirror support;

first and second mirrors, with each of said mirrors being mounted on said mirror support to allow said mirrors to pivot about parallel primarily horizontal axes independently of each other, to view screens that lie at different heights;

said frame including a first part (126) that supports said mirror support in pivoting about a primarily vertical first axis to view a screen that lies to the left or right of a direction forward of the person's head; and said frame including a second part (65) that supports said first part in pivoting about a vertical second axis (130) that is spaced from said first axis to enable said frame to be shifted to the left and right.

2. The apparatus described in claim 1 wherein:

said second part includes slidably connected parts (110, 112) that allows said frame to be slid primarily forward and rearward in use.

3. The apparatus described in claim 1 including:

a mount (72) for mounting on a wall with said second part being pivotable sufficiently on said mount about said second vertical axis to allow said frame to pivot close to the wall so it is out of the way of the person's head when the reclined person sits up.

* * * * *